United States Patent [19]

Dreiman

[11] Patent Number: 5,090,657
[45] Date of Patent: Feb. 25, 1992

[54] CABLE REINFORCED MOUNTING SYSTEM

[75] Inventor: Nelik I. Dreiman, Tipton, Mich.

[73] Assignee: Tecumseh Products Company, Tecumseh, Mich.

[21] Appl. No.: 563,279

[22] Filed: Aug. 6, 1990

[51] Int. Cl.⁵ .......................................... F16M 13/00
[52] U.S. Cl. ................................. 248/624; 248/638; 267/179
[58] Field of Search ............... 248/624, 617, 565, 637, 248/638, 618; 417/363, 902; 267/169, 179, 291

[56] References Cited

U.S. PATENT DOCUMENTS

| | | |
|---|---|---|
| 1,780,724 | 11/1930 | Short . |
| 1,852,175 | 4/1932 | Mallory . |
| 2,118,150 | 5/1938 | Brinkley . |
| 2,365,673 | 12/1944 | Benson . |
| 2,386,248 | 10/1945 | Marzetti . |
| 2,520,937 | 9/1950 | Kennard, Jr. . |
| 2,551,514 | 5/1951 | Truelove et al. . |
| 2,685,178 | 8/1954 | Eck . |
| 2,855,139 | 10/1958 | Weibel, Jr. . |
| 3,030,056 | 4/1962 | Rogers . |
| 3,138,358 | 6/1964 | Comstock et al. . |
| 3,531,069 | 9/1970 | Dubberley . |
| 3,814,357 | 6/1974 | Rontgen . |
| 4,106,881 | 8/1978 | Stannow et al. ............... 417/363 |
| 4,108,581 | 8/1978 | Miller et al. . |
| 4,306,708 | 12/1981 | Gassaway et al. . |
| 4,399,669 | 8/1983 | Jacobs . |
| 4,406,593 | 9/1983 | Kessler ....................... 248/618 X |
| 4,470,772 | 9/1984 | Gannaway . |
| 4,496,130 | 1/1985 | Toyama ....................... 248/638 X |
| 4,522,378 | 6/1985 | Nelson . |
| 4,544,334 | 10/1985 | Ellis ............................. 417/363 X |
| 4,549,859 | 10/1985 | Andrione et al. ............... 417/363 |
| 4,747,634 | 5/1988 | Hoke .............................. 267/179 X |
| 4,871,300 | 10/1989 | Outzen . |

FOREIGN PATENT DOCUMENTS 5759077 9/1980 Japan .

OTHER PUBLICATIONS

Brochure entitled "Metal Injection Smooths Small Parts Assembly" (Fisher Gauge Limited—Jan. 1989).
Brochure entitled "Design Factors and How To Use Them".

*Primary Examiner*—Ramon O. Ramirez
*Attorney, Agent, or Firm*—Baker & Daniels

[57] ABSTRACT

The present invention is a cable reinforced mounting system. Springs suspend a motor-compressor within a housing, and coaxial cables extend between the housing and the motor-compressor to dampen vibration and stabilize its position both vertically and horizontally. The cable ends have cable terminators for mounting the cable. The cable terminators are formed by metal injection molding and engage mounting brackets of the housing and on the mounts of the motor-compressor unit.

21 Claims, 3 Drawing Sheets

CABLE REINFORCED MOUNTING SYSTEM

BACKGROUND OF THE INVENTION

The present invention relates to compressors. More specifically, the present invention is a cable reinforced spring mounting system for attaching a motor-compressor to a hermetically sealed housing.

Hermetic compressors comprise a motor-compressor unit disposed within a hermetically sealed outer housing. The hermetic compressor is easily incorporated into an appliance by mounting the compressor to the appliance cabinet and making the appropriate electrical and fluid connections. However, compressors generate undesired noise and vibrations which can only be reduced by isolating the motor-compressor unit to suppress such noise and vibrations. To mount the motor-compressor within the housing, a spring mounting system is employed, including resilient springs which suspend the motor-compressor unit and suppress transmission of noise and vibration.

One spring mounting system is disclosed in U.S. Pat. No. 4,406,593, assigned to the assignee of the present invention, the disclosure of which is expressly incorporated by reference. The springs resist the vibration of the compressor by resisting both horizontal and vertical movement. Mounting studs are attached to the housing bottom and the bottom of the stator, with a connecting and supporting spring being engaged with a pair of corresponding studs. Each mounting stud extends into the interior of the connecting spring, limiting the possible vertical compression of the spring. However, the studs can only stop downward movement of the motor-compressor and do not limit horizontal or upward movement.

Another known spring mounting system for motor-compressors generally includes four components: a mounting plate, a mounting stud, a spring, and an insert. The mounting stud is attached to the lower part of the compressor housing, typically by spot welding. The mounting plate holds the motor-compressor unit and provides mounting locations for springs. The spring extends between and engages the mounting stud and the mounting plate. The tensile strength of the spring resists the upward movement of the motor-compressor, and the insert acts as a stop for downward movement. The insert is pivotal about the mounting stud and the mounting location on the mounting plate, allowing the motor-compressor to oscillate horizontally while still limiting downward movement. However, no provision is made for limiting upward movement.

A problem common with prior art spring mounting systems involves the motor-compressor abutting the upper portion of the housing due to vibration. To minimize the chance of contact and damage from abutting the upper portion, a relatively large space must be provided in the upper portion to accommodate the vibrating motor-compressor, or alternately space must be provided to accommodate stops. The housing, and therefore the entire compressor, must be sufficiently large to provide the large space for accommodating the possible movement of the motor-compressor or for locating stops.

An additional problem with prior art spring mounting systems is that they can be damaged when a lateral force acts on the spring simultaneously with a vertical force. This can happen when an assembled compressor falls to the ground on its edge, which sometimes occurs during transportation of the compressor after assembly. The resulting stress on the spring may deform the spring or alter its position relative to the compressor and housing either of which unbalances the mounting and may lead to more serious difficulties with the compressor components.

A further problem with prior art spring mounting systems involves the oscillation of the motor-compressor unit during starting and stopping. This horizontal oscillation about the shaft may result in overstressing and failure of the spring, and possibly some compressor components. To limit this oscillation, either stops or thicker springs may be employed. Stops require adding a component during assembly to the housing. Further, banging noise may result due to sharp impacts of the motor-compressor unit against the stops. Thicker springs inhibit the oscillation of the motor-compressor, but the increased stiffness of the springs increases the amount of noise and vibration transmitted from the motor-compressor to the housing.

What is needed is a spring mounting system which dampens vibration and limits excessive horizontal displacement of the motor-compressor.

Also needed is a system which resists downward movement without increasing transmission of noise and vibration.

A further need exists for a motor-compressor mounting system which minimizes the number of component parts.

Another need exists for a system which avoids using upward stops without employing a thicker spring.

SUMMARY OF THE INVENTION

The present invention is a cable reinforced mounting system for a compressor which provides improvements over prior art spring mounting systems. At least one cable is disposed within the spring to limit upward movement and provide additional resistance to downward movement. Thus, the cable acts as a positive stop to avoid abutting the upper portion of the housing. Further, the cable attachment tends to stabilize the motor-compressor by inhibiting horizontal movement.

The present invention, in one form, also simplifies assembly of the compressor by integrating the cable with cable terminators which may be formed by metal injection. No modification of existing compressor design is necessary, and stops on the upper portion of the housing are not required. The cable is disposed within the spring, and the cable terminators are attached to the housing and the motor-compressor unit. Further, the assembly is protected during shipment from simultaneous application of vertical and horizontal forces which may otherwise damage the spring.

Downward movement of the motor-compressor unit is inhibited by the cable because it offers additional resistance when compressed. The cable may be pre-stretched so that the tension of the spring does not work against the compression of the cable. Thus the stiffness of the cable adds to the resistance of the spring to minimize the downward movement of the motor-compressor.

The cable also aids in dampening vibration from the motor-compressor. The strands of the multi-strand wire of the cable absorb much of the vibration and noise because of internal friction. Oil which resides between the strands further absorbs vibration and noise.

The present invention, in one form, is a compressor including a housing and a motor-compressor unit, with springs and cables connected between the housing and motor-compressor. The housing includes a plurality of mounting brackets. The motor-compressor unit is operably disposed within the housing, and includes a plurality of mounts located at positions corresponding to the mounting brackets. Each of the springs is disposed between a bracket and mount. The cables limit the extension of the springs, which extend between and connect to the brackets and mounts thereby reinforcing the springs.

One object of the present invention is to provide a spring mounting system which dampens and limits horizontal vibrations.

Another object is to provide a system which resists downward movement without increasing transmission of noise and vibration.

A additional object is to provide a system which minimizes the number of component parts.

A further object is to provide a system which minimizes the use of upward stops without employing a thicker spring.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates preferred embodiments of the invention, in many forms, and such exemplifications are not to be construed as limiting the scope of the invention in any manner.

DESCRIPTION OF THE PREFERRED EMBODIMENT

Figure 1:
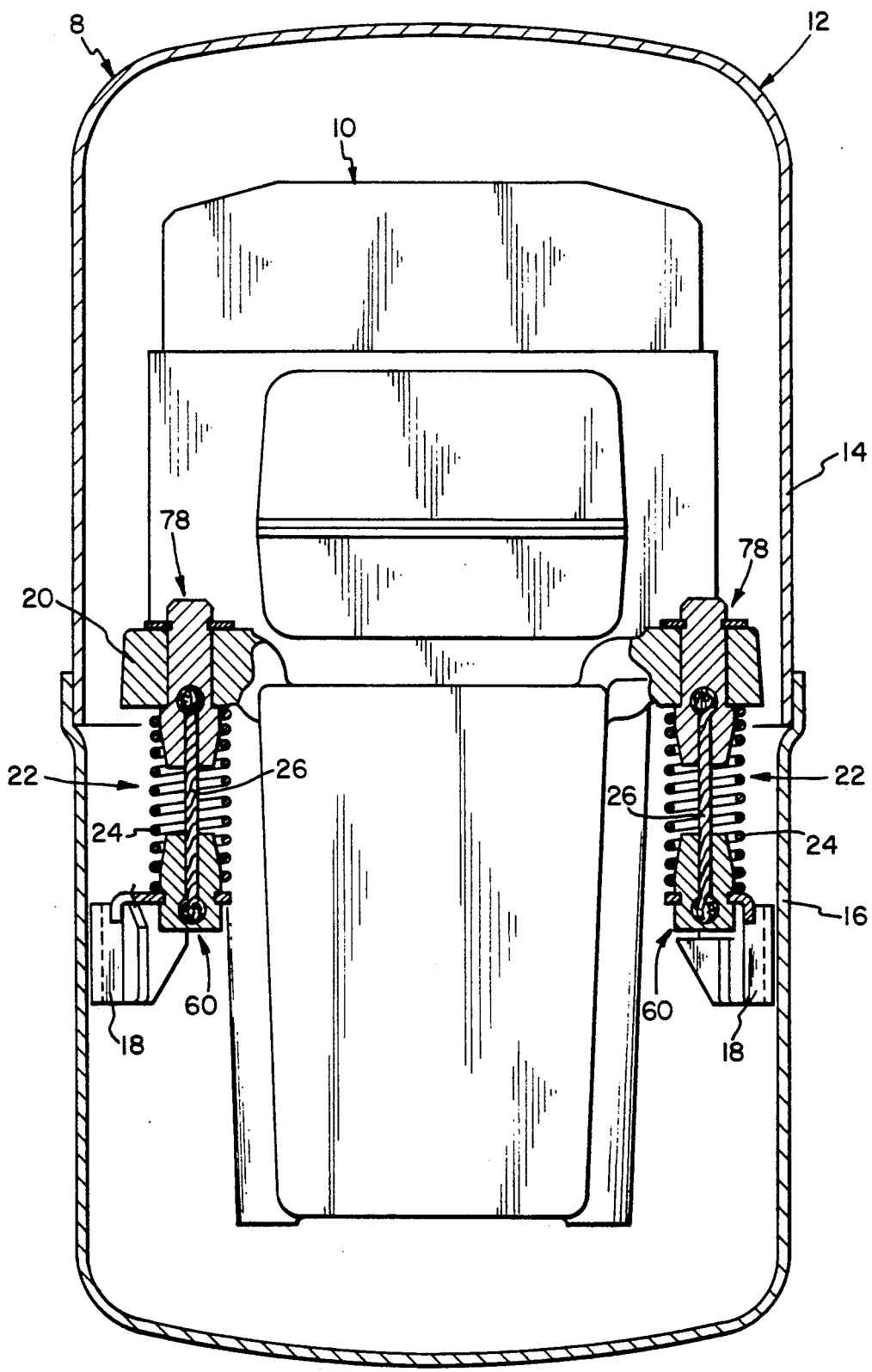
FIG. 1 is a side view, in partial cross-section, of a compressor with the cable reinforced mounting system of the present invention.

The present invention relates to compressor 8 as shown in FIG. 1. Hermetic compressor 8 includes motor-compressor unit 10 operably disposed within housing 12, which includes upper portion 14 and lower portion 16. The details of a suitable motor-compressor unit 10 which is compatible with the present invention are described in U.S. Pat. No. 3,663,127, the disclosure of which is expressly incorporated by reference. Motor-compressor 10 which is used in the preferred embodiment weights about 65 pounds. Disclosure of the working arrangement of motor-compressor 10 is not needed for full comprehension of the present invention, therefore motor-compressor unit 10 is not shown or described in detail.

Mounting brackets 18 are attached by welding or the like to an inner wall of lower portion 16 for mounting motor-compressor unit 10 within housing 12. Crankcase or mounting plate 20 is attached to motor-compressor unit 10, and extends vertically over mounting brackets 18. Cable reinforced mounting system 22, described in more detail below in the discussion of FIG. 5, includes springs 24 which support crankcase or mounting plate 20 over mounting bracket 18.

In accordance with the present invention, spring mounting system 22 includes multi-stranded, twisted cables 26 which are disposed coaxially within springs 24. In the preferred embodiment, springs 24 have a diameter of about 1.0 inches, a length of about 2.0 inches, and a preloaded tension of about 20 pounds. Cable 26 positively stops upward movement of motor-compressor unit 10. Additionally, cable 26 resists the downward movement of motor-compressor 10 by the stiffness of the cable material. Also, friction between the strands of cables 26 helps to dampen the transmission of vibration and noise and resists lateral movement. Each cable 26 many be used with different types of terminators or fittings at each end as illustrated in FIGS. 2-6.

In the preferred embodiment, cable 26 is made from carbon steel, although any suitable material may be used, such as stainless steel 18-8 grade, type 302, or type 316. The cable should have the properties of relatively high strength, high crush resistance, and high fatigue resistance. The specific type of cable used in the preferred embodiment comprises 6 strands each 0.060 inches in diameter and made of 19 strands, and is made by Sava Industries of Riverdale, N.J. Preferably, the cable is prestressed before fixing in final position. Similar cables are employed in the embodiments of FIGS. 2-6.

Figure 2:
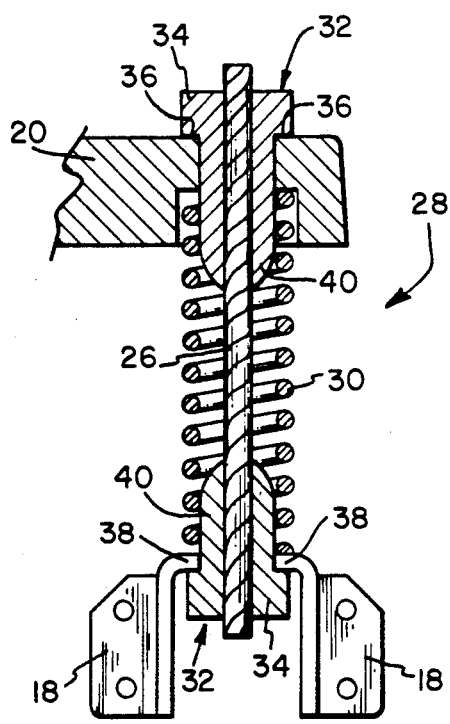
FIG. 2 is a cross-sectional view of one embodiment of the mounting system.

Referring to the embodiment of FIG. 2, cable reinforced mounting system 28 includes cable 26 coaxially disposed within spring 30. Cable terminators 32 are joined at the upper and lower ends of cable 26 and are formed by injection metal molding. Flange portion 34 of the upper cable terminator 32 extends over mounting portion surface 36 of crankcase or mounting plate 20, while flange portion 34 of lower cable terminator 32 engages fingers 38 of mounting bracket 18. Shank portions 40 of cable terminators 32 support the ends of springs 30. The outer diameter of shank portions 40 frictionally engage the inner diameters of springs 30, thus securing the ends of spring 30.

Cable terminators 32 securely attach to cables 26 because the injection metal molding process allows the injected metal to penetrate between the strands of which cable 26 is comprised. Terminators 32 are frictionally secured to plate 20 and mounting brackets 18, although terminators 32 may be secured by welding or otherwise. In the preferred embodiment, an alloy of zinc is used as the injected metal, which can be obtained from Fishertech of Peterborough, Ontario, Canada. The zinc alloy provides the desired bonding and rigidity features for satisfactorily bonding with the cable and forming a structurally rigid body. The configuration of commonly available 6 and 8 strand cables is well adapted for permitting injected metal to penetrate the outer periphery of the cable and solidify.

Figure 3:
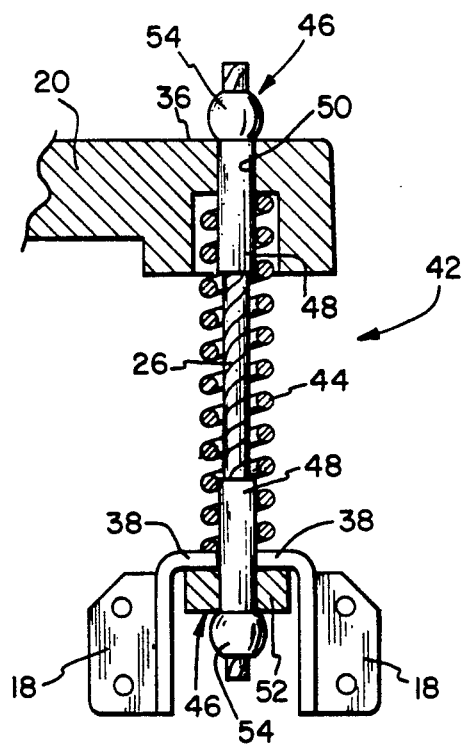
FIG. 3 is a cross-sectional view of another embodiment of the mounting system.

Referring to the embodiment of FIG. 3, cable reinforced mounting system 42 includes cable 26 coaxially disposed within spring 44. Ball and shank fittings 46 are rigidly attached at the ends of cable 26, and are secured to crankcase or mounting plate 20 and mounting bracket 18. Shank portions 48 are generally cylindrical and support the ends of springs 44. Shank portion 48 of the upper fitting 46 extends through and is frictionally secured within aperture 50 of crankcase or mounting plate 20, and shank portion 48 of the lower fitting 46 extends through and is secured to stud 52 which engages fingers 38. Ball portions 54 of fittings 46 are generally spherical and have a greater diameter than the generally cylindrical shank portions 48 to keep fittings 46 from sliding through either aperture 50 or stud 52.

Figure 4:
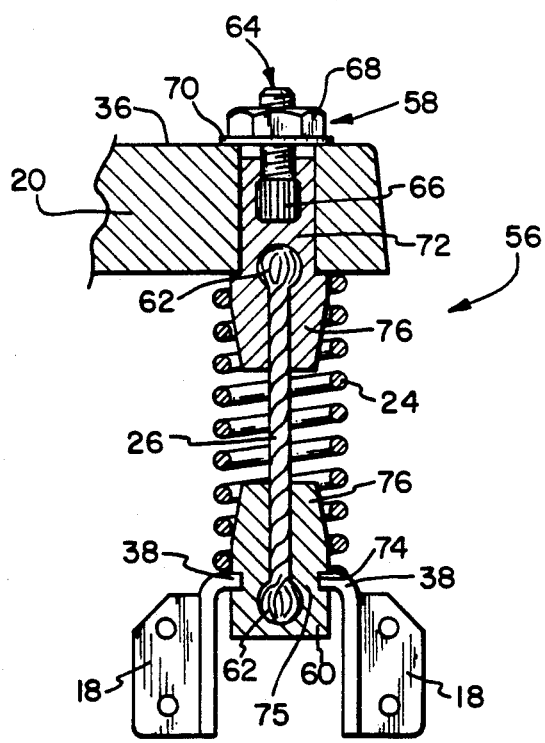
FIG. 4 is a cross-sectional view of a further embodiment of the mounting system.

Referring to the embodiment of FIG. 4, cable reinforced mounting system 56 includes cable 26 coaxially disposed within spring 24, and having upper cable terminator 58 and lower cable terminator 60 at the upper and lower frayed or enlarged ends 62 of cable 26. Frayed ends 62 are formed by unraveling and expanding the strands of cable 26 and forming the strands into a more spaced apart, spherical shape which allows injected metal to flow around and between every wire strand and form a bond which can withstand relatively high torque and press-out forces. Upper cable terminator 58 includes bolt 64 with knurled stem 66 and nut head 68, washer 70, and injection metal body 72. Washer 70 abuts mounting portion surface 36, and knurled stem 66 bonds with body 72 to secure cable terminator 58 to crankcase or mounting plate 20. Lower cable terminator 60 includes groove 74 in engaging portion 75 which receives fingers 38 of mounting bracket 18 to anchor terminator 60 to crankcase or mounting plate 20. Both terminators 58 and 60 include a shank portion 76 which supports spring 24.

Figure 5:
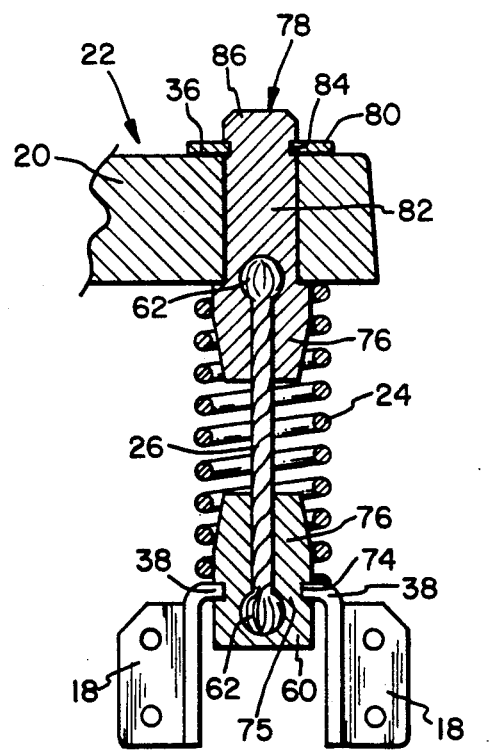
FIG. 5 is a cross-sectional view of a further embodiment of the mounting system.

Referring to the embodiment of FIG. 5, cable reinforced mounting system 22 includes cable 26 coaxially disposed within spring 24, and having upper cable terminator 78 and lower cable terminator 60. Frayed ends 62 are located at the upper and lower ends of cable 26. Upper cable terminator 78 includes retaining ring 80 and injection metal body 82, which includes groove 84 and top portion 86 for receiving snap ring 80. Snap ring 80 abuts surface 36 to secure terminator 78 to crankcase or mounting plate 20. Lower cable terminator 60 is as described in connection with FIG. 4. Both terminators 78 and 60 include shank portion 76 which supports spring 24.

Figure 6:
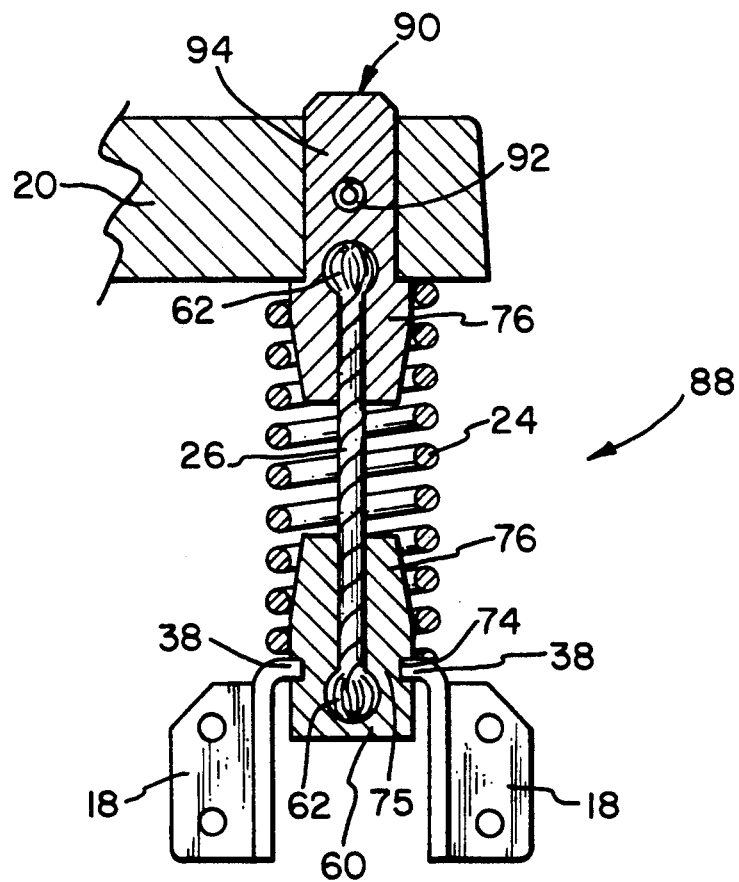
FIG. 6 is a cross-sectional view of a further embodiment of the mounting system.

Referring to the embodiment of FIG. 6, cable reinforced mounting system 88 includes cable 26 coaxially disposed within spring 24, and having upper cable terminator 90 and lower cable terminator 60. Enlarged, frayed ends 62 are located at the upper and lower ends of cable 26. Upper cable terminator 90 is molded around spring pin 92 which extends through injection metal body 94. Spring pin 92 secures terminator 90 within crankcase or mounting plate 20, and lower cable terminator 60 is as described in connection with FIG. 4. Both terminators 90 and 60 include a shank portion 76 which supports spring 24.

An additional variation of the present invention involves the use of multiple cables within each spring. Additional cables are easily accommodated in the design because the injection metal molding operation which forms the cable terminators needs little modification to include two or more cables within the molded terminator body. The additional cables provide increased resistance to downward movement of motor-compressor 10, and dampen noise and vibration better than using a single cable which may be too thick or stiff to dampen effectively.

A further variation of the present invention involves simplifying the means of connecting mounting bracket 18 to crankcase or mounting plate 20 by knotting the ends of cable 26. Also, any other suitable way to attach the ends of cable 26 either directly or indirectly, are within the teachings of this disclosure.

The steel cable of the present invention serves as a transport abutment which resists movement of the motor-compressor toward the housing bottom and limits upward movement without creating impact noise. The steel cable also decelerates lateral movement of the motor-compressor relative to the mounting brackets, and reduces deformation and overstressing of the mounting springs by providing additional flexural strength.

The present invention helps to avoid buckling of the springs, to dampen oscillations of the motor-compressor during start-up, to limit horizontal rotation in any direction about the axis of the crankshaft, and to prevent vertical movement of the motor-compressor in the housing. The mounting system saves space within the housing and is unaffected by corrosive or aggressive medium, vacuum, or elevated temperatures present in the housing, while still attenuating vibration and noise.

The response characteristics of the steel cable can be easily adjusted by changing the cable diameter, the number of strands per cable, cable length, cable twist or lay, cable material, the initial tension, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressor comprising:
   a housing including a plurality of mounting brackets;
   a motor-compressor unit operably disposed within said housing, said motor-compressor unit including a plurality of mounts located at positions corresponding to said mounting brackets;
   a plurality of springs, each of said springs disposed between a respective said mounting bracket and mount;
   a plurality of cables for limiting the lateral and downward motion of said motor-compressor unit, said cables stretched between respective said mounting brackets and mounts to thereby reinforce said springs; and
   means for connecting first and second ends of said cables to respective said mounting brackets and mounts.

2. The compressor of claim 1 wherein said cables are coaxial with respective said springs.

3. The compressor of claim 1 wherein said connecting means includes cable terminators made of an injection molded metal.

4. The compressor of claim 3 wherein said cable terminators have a generally frusto-conical body with an outer circumference engaged with the inner circumference of a respective said spring.

5. The compressor of claim 3 wherein said first and second ends of said cables include a multi-strand wire wherein individual strands of said wire are unraveled and expanded to form an enlarged end.

6. The compressor of claim 3 wherein said cable terminators include a fitting with a generally cylindrical shank portion ending with an enlarged portion.

7. The compressor of claim 1 wherein said cable is a multi-strand wire cable.

8. The compressor of claim 1 wherein said connecting means includes first and second cable terminators attached to respective ends of said cables, said first cable terminators having a body with a groove which engages said mounting bracket, and said second cable terminators including a body with an engaging portion and a snap ring, said engaging portion including a groove for receiving said snap ring to thereby secure said second cable terminators to said mounts.

9. The compressor of claim 1 wherein said connecting means includes first and second cable terminators attached to respective ends of said cables, said first cable terminators having a body with a groove which engages said mounting bracket, and said second cable terminators including a body with an engaging portion and a spring pin connected to a respective said mount, said engaging portion formed around said spring pin to thereby secure said second cable terminators to said mounts.

10. The compressor of claim 1 wherein said connecting means includes first and second cable terminators attached to respective ends of said cables, said first cable terminators having a body with a groove which engages said mounting bracket, and said second cable terminators including a body with an engaging portion and a bolt with a knurled stem, said engaging portion formed around and onto said knurled stem to thereby secure said second cable terminators to said mounts.

11. The compressor of claim 1 wherein said connecting means includes first and second cable terminators attached to respective ends of said cables, said first cable terminators having a body with a groove which engages said mounting bracket, and said second cable terminators including a body with
an engaging portion extending through and over said mount to thereby secure said second cable terminators to said mounts.

12. A compressor comprising:
a housing including a plurality of mounting brackets;
a motor-compressor unit operably disposed within said housing, said motor-compressor unit including a plurality of mounts located at positions corresponding to said mounting brackets;
a plurality of springs, each of said springs disposed between a respective said mounting bracket and mount;
a plurality of multi-strand wire cables extending within said springs; and
a plurality of first and second cable terminators attached to respective first and second ends of said cables, each said first cable terminator having a body engaging a respective said mounting bracket, each aid second cable terminator having a body engaging a respective said mount to thereby stretch said cable between said housing and said motor-compressor.

13. The compressor of claim 12 wherein said cables are coaxial with said respective springs.

14. The compressor of claim 12 wherein said cable terminators are made of an injection molded metal.

15. The compressor of claim 14 wherein said cable includes a multi-strand wire wherein individual strands of said wire are unraveled and expanded to form an enlarged end extending within said cable terminator.

16. The compressor of claim 14 wherein said cable terminators include a fitting comprising a generally cylindrical shank portion ending with an enlarged portion.

17. The compressor of claim 12 wherein each said first cable terminator body includes a groove which engages said respective mounting bracket, and each said second cable terminator body includes an engaging portion and a snap ring, said second cable terminator body including a groove for receiving said snap ring to thereby secure said second cable terminators to said respective mounts.

18. The compressor of claim 12 wherein each said first cable terminator body includes a groove which engages said respective mounting bracket, and each said second cable terminator body includes an engaging portion and a spring pin connected to a respective said mount, said second cable terminator body formed around said spring pin to thereby secure said second cable terminators to said respective mounts.

19. The compressor of claim 12 wherein each said first cable terminator body includes a groove which engages said respective mounting bracket, and each said second said cable terminator body includes an engaging portion and a bolt with a knurled stem, said engaging portion formed around and onto said knurled stem to thereby secure said second cable terminators to said respective mounts.

20. The compressor of claim 12 wherein each said first cable terminator body includes a groove which engages said respective mounting bracket, and each said second cable terminator body includes an engaging portion extending through and over said respective mount to thereby secure said second cable terminators to said respective mounts.

21. A compressor comprising:
a housing including a plurality of mounting brackets;
a motor-compressor unit operably disposed within said housing, said motor-compressor unit including a plurality of mounts located at positions corresponding to said mounting brackets;
a plurality of springs, each of said springs disposed between a respective said mounting bracket and mount;
a plurality of cables for limiting the extension of said springs, said cables extending between respective said mounting brackets and mounts to thereby reinforce said springs, said cables including a multi-strand wire; and
a plurality of cable terminators made of injection molded metal for connecting first and second ends of said cables to respective said mounting brackets and mounts wherein individual strands of said wire are unraveled and expanded to form an enlarged end.

* * * * *

UNITED STATES PATENT AND TRADEMARK OFFICE
CERTIFICATE OF CORRECTION

PATENT NO. : 5,090,657

DATED : February 25, 1992

INVENTOR(S) : Nelik I. Dreiman

It is certified that error appears in the above-identified patent and that said Letters Patent is hereby corrected as shown below:

Claim 12, Column 7, Line 61, delete "aid" and substitute therefor --said--.

Signed and Sealed this

First Day of June, 1993

Attest:

MICHAEL K. KIRK

*Attesting Officer*   *Acting Commissioner of Patents and Trademarks*